(12) United States Patent
Rechtman

(10) Patent No.: US 6,508,206 B1
(45) Date of Patent: Jan. 21, 2003

(54) FEED WATER HEATER

(75) Inventor: Yuri M. Rechtman, St. Louis County, MO (US)

(73) Assignee: Nooter/Eriksen, Inc., St. Louis, MO (US)

( * ) Notice: Subject to any disclaimer, the term of this patent is extended or adjusted under 35 U.S.C. 154(b) by 0 days.

(21) Appl. No.: 10/052,137

(22) Filed: Jan. 17, 2002

(51) Int. Cl.$^7$ ............................. F22D 1/28; F22D 1/32
(52) U.S. Cl. ...................... 122/7 R; 122/1 C
(58) Field of Search .................. 122/1 C, 7 R, 122/412, 415, 422, 466

(56) References Cited

U.S. PATENT DOCUMENTS

| | | | | |
|---|---|---|---|---|
| 2,931,344 A | * | 5/1960 | Stiers | 122/1 C |
| 5,127,470 A | * | 7/1992 | Inaba et al. | 122/7 R |
| 6,343,570 B1 | * | 2/2002 | Schmid et al. | 122/7 R |

* cited by examiner

Primary Examiner—Gregory Wilson
(74) Attorney, Agent, or Firm—Polster, Lieder, Woodruff & Lucchesi, L.C.

(57) ABSTRACT

A feedwater heater for a steam generator or heat recovery boiler or waste heat boiler through which hot gases pass includes two sections which are located side by side so that the temperature of the hot gases at the upstream face of each section is essentially the same. The feedwater flows through a heat exchanger before entering the first section, and here it is heated by water flowing from the upstream face of the first section to the downstream face of the second section. The arrangement is such that all tubes in the two sections remain above the dew point of the hot gases, so that water does not condense on the tubes and unite with oxides of sulfur to form sulfuric acid which will corrode the tubes, yet substantial temperature differentials exist between the water in the sections and hot gases as the gases pass through the sections.

10 Claims, 2 Drawing Sheets

FEED WATER HEATER

BACKGROUND OF THE INVENTION

This invention relates in general to steam generators or boilers and more particularly to a feedwater heater and feedwater heating process for a steam generator.

Natural gas represents a significant source of electrical energy in the United States. It burns with few emissions, and is available throughout much of the country. Moreover, the plants which convert it into electrical energy are efficient and, in comparison to hydroelectric projects and coal-fired plants, they are relatively easy and inexpensive to construct. In the typical plant, the natural gas burns in a gas turbine, causing the rotor of the turbine to revolve and power an electrical generator to which the rotor is connected. The exhaust gases—essentially carbon dioxide and steam—leave the gas turbine at about 1200° F. and themselves represent a significant source of energy. To harness this energy, the typical combined cycle, gas-fired, power plant also has a heat recovery steam generator (HRSG) through which the hot exhaust gases pass to produce steam which powers a steam turbine which, in turn, powers another electrical generator. The exhaust gases leave the HRSG at temperatures as low as 150° F.

The steam turbine and the HRSG operate within a loop that also contains a condenser and a feedwater pump. The steam generated by the HRSG passes through the turbine and then into the condenser where it is condensed back into liquid water. The pump delivers that water to the HRSG at about 100° F. or perhaps a lower temperature. The water enters the HRSG at a feedwater heater or economizer which elevates its temperature for subsequent conversion into steam within an evaporator and superheater that are also part of the HRSG.

Natural gas contains traces of sulfur, and during the combustion the sulfur combines with oxygen to produce oxides of sulfur. Moreover, the combustion produces ample quantities of water in the form of steam. If the exhaust gases remain above the dew point for the gases, which is about 140° F., the oxides of sulfur pass out of the HRSG and into a flue. However, the low temperature feedwater has the capacity to bring the tubes at the downstream end of the feedwater heater below the dew point of the water in the exhaust gases, and when this occurs, water condenses on tubes. The oxides of sulfur in the flue gas unite with that water to form sulfuric acid which is highly corrosive. In order to deter the formation of sulfuric acid, manufacturers of HRSGs attempt to configure the HRSGs such that the feedwater enters them at a temperature above the dew point for the exhaust gases.

In one configuration that achieves this end (FIG. 1), a pump draws off some of the heated feedwater at the outlet of the feedwater heater and returns it to the inlet of the feedwater heater where it mixes with the colder feedwater derived from the condenser. The temperature of the mixed feedwater is elevated to about 140° F. This configuration requires an additional pump which operates continuously and consumes electrical energy. Apart from that, the pump requires maintenance from time to time.

In a more sophisticated configuration (FIG. 2), the feedwater heater has two sections which are located in series insofar as the flow of the exhaust gases is concerned, there being an upstream section and a downstream section. The water flows in the opposite direction, that is to say first through the downstream section and then through the upstream section. Between the two sections the water flows through a heat exchanger that is external to the gas flow. The feedwater from the condenser also passes through the external heat exchanger before entering the first section of the heater. The heat exchanger elevates the temperature of the feedwater from the condenser to at least 140° F. before the water enters the downstream section of the feedwater heater, so no condensation occurs on the tubes of that section. Since the feedwater entering the upstream section, after having passed through the heat exchanger, must be at least 140° F. to avoid producing condensation, the temperature differential between the exhaust gases and the tubes at the outlet of the downstream section is relatively small—or, in other words, the downstream section is tightly pinched at its outlet. This requires a greater surface area to achieve the required heat transfer.

The problem of condensation in feedwater heaters or economizers is not confined solely to HRSGs installed downstream from gas turbines. Indeed, it can occur almost anywhere energy is extracted from hot gases flowing through a duct to heat the feedwater for a boiler. For example, many power plants convert the hot gases derived from the combustion of fossil fuels, such as coal or oil, directly into steam, and the boilers required for the conversion, to operate efficiently, should have feedwater heaters—heaters which should not produce condensation. Also, systems exist for producing steam from the hot gases derived from the incineration of waste, and they likewise have boilers including feedwater heaters that should not be subjected to condensation.

SUMMARY OF THE INVENTION

The present invention resides in a feedwater heater having two sections, each of which sees gases at essentially the same temperature at its upstream face. Feedwater enters the first section through a heat exchanger where it is heated by water flowing from the first section to the second section. The invention also resides in a process embodied in the operation of the feedwater heater and in a steam generator containing the feedwater heater.

DETAILED DESCRIPTION OF INVENTION

Figure 1:
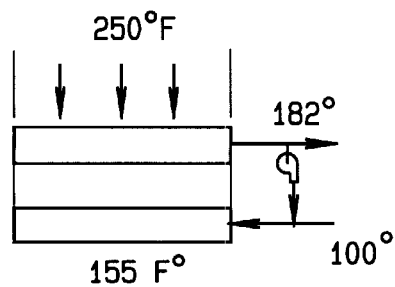
FIG. 1 is a schematic view of a basic feedwater heater of the prior art.
Figure 2:
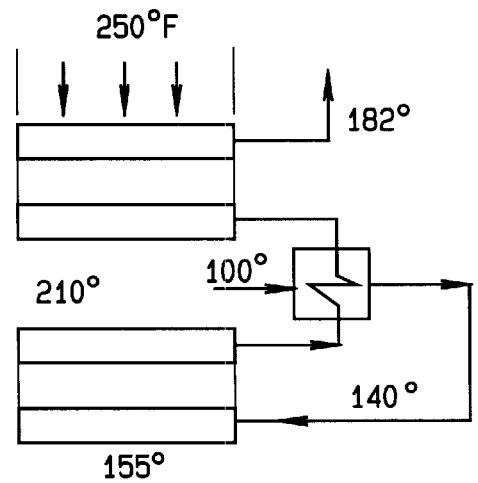
FIG. 2 is a schematic view of a more sophisticated feedwater heater of the prior art.
Figure 3:
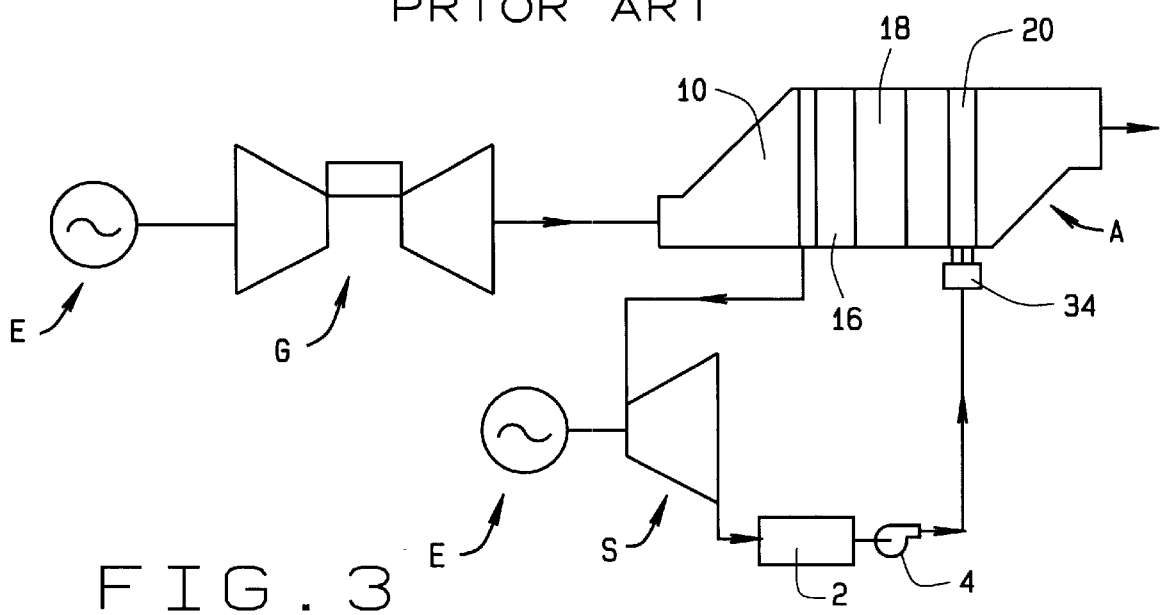
FIG. 3 is a schematic view of a power system that utilizes an HRSG provided with a feedwater heater constructed in accordance with and embodying the present invention.

Referring now to the drawings (FIG. 3), a gas turbine G discharges hot exhaust gases into a heat recovery steam generator (HRSG) A which extracts heat from these gases to produce steam which powers a steam turbine S. Both the gas turbine G and steam turbine S power generators E capable of producing electrical energy. The steam turbine S discharges the steam at a low temperature and pressure into a condenser 2 where it is condensed into liquid water. The condenser 2 is connected to a condensate pump 4 which directs the water back to the HRSG A as feedwater, and the HRSG A converts that feedwater into superheated steam which flows to the steam turbine S.

Figure 4:
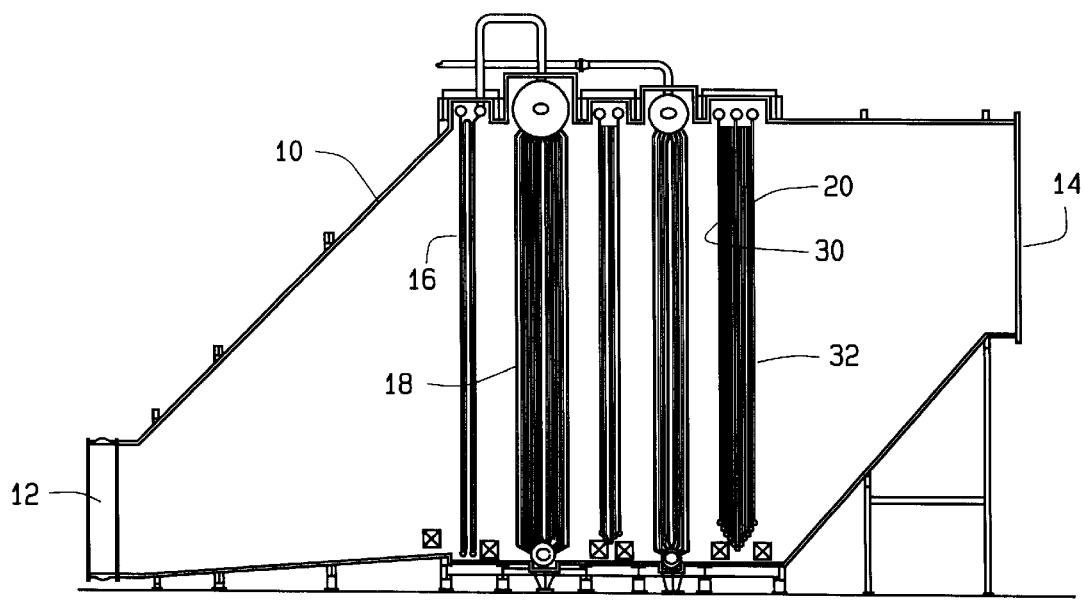
FIG. 4 is a sectional view of an HRSG provided with a feedwater heater constructed in accordance with and embodying the present invention.

The HRSG A includes (FIG. 4) a duct 10 having an upstream end 12 and a downstream end 14. The former is connected to the gas turbine G such that the exhaust gases discharged by the turbine G flow into and through the HRSG A. The discharge end 14 is connected to a flue which directs the exhaust gases to the atmosphere. The HRSG A also includes a superheater 16, at least one evaporator 18, and a feedwater heater 20 arranged basically in that order within the duct 10 from its upstream end 12 to the downstream end 14. The feedwater heater 20 elevates the temperature of the feedwater from approximately 100° F. to over 180° F. The high temperature feedwater flows into the evaporator 18 which converts it into saturated steam. The superheater 16 converts the saturated steam into superheated steam which flows on to the steam turbine S to power it.

Figure 5:
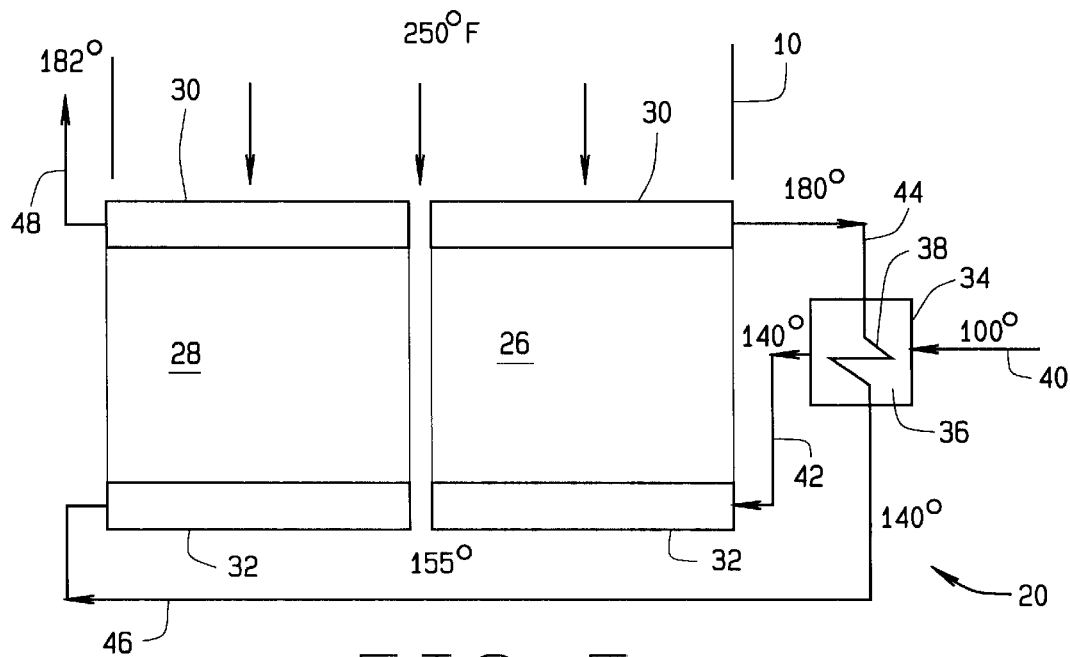
FIG. 5 is a schematic view of the feedwater heater of the present invention.

Turning now to the feedwater heater 20, it has (FIG. 5) two sections 26 and 28 formed from the usual tubes and headers, with the tubes extending through the duct 10 transversely with respect to the flow of the exhaust gases and the headers being along the walls of the duct 10. The two sections 26 and 28 are arranged side by side in the duct 10 or at least such that the exhaust gases enter each at essentially the same temperature. Indeed, each section 26 and 28 has an upstream face 30 at which the gases flow into it and a downstream face 32 at which the gases leave it. Tubes for the sections 26 and 28 are at both faces 30 and 32. In effect, each section 26 and 28 is a counterflow gas-to-liquid heat exchanger, but could also be a crossflow heat exchanger. In addition, the feedwater heater 20 has a water-to-water heat exchanger 34, which is located at the exterior of the duct 10. It has two paths through which water flows through it—a low temperature path 36 and a high temperature path 38—and each has an inlet and an outlet. The inlet for the low temperature path 36 is connected to the condensate pump 4, whereas the outlet is connected to the first section 26 at its downstream face 32. The inlet for the high temperature path 38 is connected to the first section at its upstream face 30, whereas the outlet is connected to the second section 28 at its downstream face 32.

The condensate pump 4 discharges the feedwater into a supply pipe 40 which delivers it to the inlet of the low temperature path 36 of the heat exchanger 34. The feedwater leaves the low temperature path 36 at its outlet and flows into a connecting pipe 42 which delivers it to the tubes at the downstream face 32 of the section 26. The water leaves the section 26 at its upstream face and flows to the heat exchanger 34 in a transfer pipe 44 which connects with the inlet of the high temperature path 38. Within the high temperature path 38 the temperature of the water decreases, inasmuch as the water in that path loses heat to water in the low temperature path 36. At the outlet for the high temperature path 38 the water enters another transfer pipe 46 which delivers it to the second section 28 at the downstream face 32 of that section. The water experiences a rise in temperature in the section 28 and leaves that section at its upstream face 30 through a discharge pipe 48 which leads to and connects with the evaporator 18.

By way of example, the feedwater may leave the condenser 2 at approximately 100° F. The condensate pump 4 directs the feedwater through the supply pipe 40 which discharges it into the low temperature path 36 of the heat exchanger 34 without any significant drop in temperature. Within the heat exchanger 34, the water flowing through the high temperature path 38 that is between the two sections 26 and 28 elevates the temperature of the feedwater in the low temperature path 36. The water leaves the low temperature path 36 of the heat exchanger 34 at approximately 140° F. and flows within the pipe 42 to the section 26. The water enters the section 26 at its downstream face 32 where its temperature is approximately 140° F.

The exhaust gases from the gas turbine G, after having passed through the superheater 16 and evaporator 18 and having undergone a reduction in temperature in each, impinge upon the upstream faces 30 of the two sections 26 and 28 at approximately 250° F. They pass through the two sections 26 and 28 and leave at their downstream faces 32 where the temperature of the gases is approximately 155° F., the decrease being as a consequence of the water in the two sections 26 and 28 extracting heat from the exhaust gases. Of course, as the water flows through the section 26 from its downstream face 32 to its upstream face 30 its temperature increases. The water leaves the section 26 at the upstream face 30 where its temperature is approximately 180° F. The transfer pipe 44 which is connected to the section 26 at its upstream face 30, delivers the near 180° water to the high temperature path 38 of the heat exchanger 34 where the water looses heat to the feedwater in the low temperature path 36. The water that flows into the heat exchanger 34 from the transfer pipe 44 leaves the high temperature path 38 through the transfer pipe 46 at a lesser temperature on the order of approximately 140° F.

The transfer pipe 46 delivers the near 140° water to the downstream face 32 of the other section 28. The water passes through the section 28 and in so doing extracts heat from the exhaust gases. The temperature of the water rises within the section 28, reaching approximately 182° F. at the upstream face 30. Here it leaves the section 28 through the discharge pipe 48 and flows on to the evaporator 18 at approximately 182° F. where it is converted into saturated steam.

All surfaces of the two sections 26 and 28 for the feedwater heater 20 remain at 140° F. or higher which is above the dew point for the exhaust gases in the duct 10. Yet, in contrast to series-arranged sections, substantial temperature differentials exist between the exhaust gases, on one hand, and the water in the two sections 26 and 28, on the other, with the substantial differentials being at the upstream faces 30 of the sections 26 and 28 and at the downstream faces 32 as well. Hence, good and efficient heat transfer occurs between the exhaust gases and the water. This in turn reduces the size of the feedwater heater 20, that is to say the sections 26 and 28 for the feedwater heater 20 are more effective and thus smaller and contain less tubes than their counterparts in a series-arranged heater.

In some steam generators the feedwater heater is referred to as an "economizer" or "feedwater preheater", and in some instances the use of "feedwater heater" or "feedwater preheater" or "economizer" depends on the location of the device in relation to the pump 4. Here the expression "feedwater heater" not only identifies a device of that name, but also a feedwater preheater and an economizer located downstream in the direction of gas flow from the last boiler or evaporator in a steam generator.

The feedwater heater 20 has utility beyond HRSGs used to extract heat from the gases discharged by gas turbines. Indeed, it may be used with steam generators in a wide variety of applications, including those that extract heat from the combustion of about any type of fossil fuel and with those that extract heat from the gases derived from the incineration of waste.

What is claimed is:

1. A feedwater heater comprising: first and second sections arranged generally side by side, with each section having an upstream face and a downstream face, each section containing tubes, with some of the tubes being at the upstream face and some of the tubes being at the downstream face, each section being configured such that hot exhaust gases will pass through it and in so doing pass over the tubes in the section; and a heat exchanger having first and second paths, each path having an inlet and an outlet and each being capable of transferring water from its inlet to its outlet, the first and second paths being organized such that heat will transfer from water in the second path to water in the first path; the outlet of the first path being in communication with the tubes of the first section at the downstream face of the first section, the tubes at the upstream face of the first section being in communication with the inlet to second path of the heat exchanger; the outlet of the second path in the heat exchanger being in communication with the tubes at the downstream face of the second section.

2. A feedwater heater according to claim 1 wherein a first pipe connects the outlet of the first path in the heat exchanger with the tubes at the downstream face of the first section; a second pipe connects the tubes at the upstream face of the first section to the inlet of the second path to the heat exchanger, and a third pipe connects the outlet of the second path in the heat exchanger to the tubes at the downstream face of the second section.

3. A feedwater heater according to claim 2 and further comprising a supply pipe connected to the inlet for the first path of the heat exchanger and a discharge pipe connected to the tubes at the upstream face of the second section.

4. In a steam generator located a duct having an inlet for receiving hot exhaust gases and an outlet and including a superheater and an evaporator located in the duct in that order between the inlet and outlet, with the evaporator being in communication with the superheater for supplying saturated steam to the superheater, a feedwater heater for elevating the temperature of water delivered to the evaporator, said feedwater heater comprising: first and second sections each located in the duct downstream from the evaporator and each having an upstream face and a downstream face, each section being capable of transferring water through it and allowing the exhaust gases to flow through it, all such that heat is transferred from the exhaust gases to the water, the first and second sections being located in the duct such that the exhaust gases encounter their upstream faces at essentially the same temperature, the second section at its upstream face being connected with the evaporator so that the feedwater heater delivers heated water to the evaporator from the upstream face of the second section; and a heat exchanger in communication with the first section at its upstream and downstream faces and with the second section at its downstream face, the heat exchanger being configured to direct the feedwater to the downstream face of the first section and to use water received from the upstream face of the first section to elevate the temperature of the feedwater, whereby the feedwater enters the first section at an elevated temperature.

5. The combination according to claim 4 wherein the heat exchanger is further configured to direct water which is received from the upstream face of the first section to the downstream face of the second section after that water elevates the temperature of the feedwater.

6. The combination according to claim 5 wherein the heat exchanger has first and second paths, each provided with an inlet and an outlet and arranged such that heat will transfer from water in the second path to water in the first path; and wherein the outlet for the first path is connected to the first section at its downstream face, the inlet to the second path is connected to the first section at its upstream face, and the outlet to the second path is connected to the second section at its downstream face.

7. The combination according to claim 6 wherein the inlet for the first path in the heat exchanger is connected to a source of feedwater.

8. The combination according to claim 4 wherein the sections of the feedwater heater are located side by side in the duct.

9. The combination according to claim 4 wherein the heat exchanger is located externally of the duct.

10. A process for heating cool feedwater for a steam generator that extracts heat from a hot gas stream containing water vapor and converts the feedwater to steam, with the temperature of the feedwater initially being below the dew point of the gas stream, said process comprising: directing the cool feedwater into a heat exchanger to elevate the temperature of the feedwater above the dew point of the water vapor in the hot gases; thereafter directing the water into a first section located in the gas stream and having an upstream end and a downstream end, with the water being directed into the downstream end; therafter withdrawing the water from the upstream end of the first section and passing it through the heat exchanger to heat the cool feedwater supplied to the heat exchanger, whereby the heated water is cooled in the heat exchanger; thereafter directing the cooled water into a second section located in the gas stream and having an upstream end that encounters the hot gases at essentially the same temperature as the upstream end of the first section and also having a downstream end, with the cooled water entering at the downstream end; and withdrawing the water from the upstream end of the second section.

* * * * *